United States Patent Office 3,826,671
Patented July 30, 1974

3,826,671
METHOD FOR CONTROLLING WATER TRANSPIRATION IN PLANTS
Richard J Petrucco, Laurel Springs, and John W. Schick, Cherry Hill, N.J., assignors to Mobil Oil Corporation
No Drawing. Original application Jan. 27, 1971, Ser. No. 110,259, now abandoned. Divided and this application Dec. 7, 1972, Ser. No. 313,020
Int. Cl. A01n 5/00; C09d 3/60
U.S. Cl. 117—3          10 Claims

ABSTRACT OF THE DISCLOSURE

Water transpiration in plants, without substantially interfering with the exchange of gases essential for photosynthesis, is controlled by application to the plant surface of an emulsion composition comprising a polymer, an emulsifier, wax, petrolatum and water.

CROSS-REFERENCE TO RELATED APPLICATION

Division of application, Ser. No. 110,259, filed Jan. 27, 1971, and now abandoned.

BACKGROUND OF THE INVENTION (1) Field of the Invention

This invention relates to a method for controlling water transpiration in plants and, in one of its aspects, relates more particularly to a method for controlling water transpiration in plants without substantially interfering with the exchange of gases essential for photosynthesis. Still more particularly, in this aspect, the invention relates to a method for retarding water transpiration on plant surfaces without substantially decreasing the plant's ability to exchange gases essential for photosynthesis to take place. The invention further relates to novel emulsion compositions suitable for the above-described purposes.

(2) Description of the Prior Art

Moisture loss in plant life in the form of transpiration is normally encountered during transplanting or shipment, and can result in wilting or other forms of damage, or ultimate destruction. Such occurrence is particularly applicable to the transplantation or shipment of various types of plant life, such as tobacco, fruit, vegetables, trees and other forms of vegetation. To offset the effects of such moisture loss due to transpiration, wax has heretofore been applied to the exterior surfaces of the vegetation. In this respect, it has been found that in some instances breathing of the plant was greatly impaired to such extent that substantial damage resulted. In other instances, little or no improvement in avoiding moisture loss was observed because of failure of the wax to provide adequate and complete surface coverage. Such deleterious results have been particularly encountered during transplantation operations. In some instances wax-based anti-transpirants have been found to form effective barriers to the transmission of moisture, and as such, could be considered as a means for conserving water in water-short agricultural areas. In such instances, however, it has been found that these anti-transpirants also function as effective barriers to the transmission of gases such as oxygen, carbon dioxide and nitrogen, which are essential for photosynthesis.

SUMMARY OF THE INVENTION

It has now been found that transpiration in plants can be effectively controlled by applying to the plant surfaces a composition in the form of an emulsion comprising a polymer, an emulsifier, and water. With respect to the individual components emplyed in producing the emulsion, the polymer component is employed in an amount from about 5 to about 50, and preferably from about 30 to about 45 percent, by weight of the total weight of the emulsion. The emulsifier is employed in an amount from about 2 to about 10, and preferably from about 4 to about 8 percent, by weight, of the total weight of the emulsion. Water is employed in an amount sufficient to balance the formulation.

The polymer employed in the novel pesticidal compositions of the present invention may comprise any emulsifiable polymer or polymeric material. Representative of such polymeric materials are polymers and copolymers of polyethylene, polypropylene, polybutene and higher hydrocarbon polymers; copolymers of ethylene and propylene, butene, vinyl acetate, vinyl acrylate and other copolymers of ethylene and other monomers.

The emulsifier employed in the emulsions of the present invention may be of any type, thus including the non-ionic, anionic and cationic types. Many non-ionic emulsifiers can be used in this emulsion provided the critical relationship between oil solubility and water solubility is maintained. Typical of such emulsifiers are mixtures of sorbitan monooleate and polyoxyethylene sorbitan monooleate. Typical other non-ionic emulsifiers suitable for use in these emulsions are polyoxyethylene ethers of octyl or nonyl phenol having variable amounts of ethylene oxide content per mol of finished product required to provide the oil and water solubility characteristics. Thus, for example, a portion of polyoxyethylene ethers of octyl phenol having about 5 mols of ethylene oxide per mol of finished product when blended with a like amount of polyoxyethylene ethers of octyl phenol having about 10 mols of ethylene oxide per mol of finished product, provides an emulsifier combination having the desired water and oil solubility. As the ethylene oxide content is reduced, oil solubility is enhanced, whereas as the ethylene oxide content is increased, water solubility is enhanced. A blended product having sufficient oil-soluble and water-soluble constituents and possessing an average ethylene oxide content per mol of finished product between about 5 and 10 is quite satisfactory. Other non-ionic emulsifiers contemplated within the scope of the present emulsions are exemplified by partial esters of fatty acids (e.g., palmitic, stearic, oleic and the like) and hexitol anhydrides (hexitans and hexides) derived from sorbitol. These materials, to which polyoxyethylene chains have been added to the non-esterified hydroxyls to increase water solubility, are blended with the untreated material to provide solubility balance. Also usable in this area are the condensation products of ethylene oxide and relatively high molecular weight polypropylene glycol. The molecular weight of the compound may be as high as 8,000.

As hereinbefore indicated, the emulsifier employed in the emulsion may be of the anionic type. These may include triethanolamine or other soaps, lignin sulfonates, naphthalene sulfonates and protective colloids, such as natural gums, gelatin, casein, cellulose derivatives and the like.

The emulsifiers employed in the emulsions of the present invention may also be of the cationic type. For this purpose, various types of cationic emulsifying agents may be employed. One preferred type is an emulsifying agent comprising an amine salt of an acid selected from the group consisting of organic acids having from about 1 to about 18 carbon atoms, or inorganic mineral acids, which are reacted with an amine having from about 10 to about 40 carbon atoms. Furthermore, it should also be noted that where the emulsion contains cationic emulsifiers, emulsion modifiers may also be present, such as amines having up to 12 carbon atoms per molecule, and may therefore comprise aliphatic, cycloaliphatic, aromatic and primary, secondary or tertiary amines. Representative amines employed as the emulsion modifier include dicyclohexylamine, n-heptyl beta-amine, n-octyl amine, n-dodecylamine, n-dodecyl 1,3 propylene diamine, aniline and N-dodecyl 1,3 propylene beta-diamine. Water, as previously indicated, is employed in an amount sufficient to balance the formulation, and may therefore be present, for example, in an amount varying from about 25 to about 88 percent, by weight, of the total emulsion.

Wax may also be present as an additional component of the emulsion, if so desired. In such modification, the wax is present in minor proportion, based on the total weight of polymer and wax present. The wax component of the emulsion may comprise any non-phytoxic wax, such as a paraffin wax, scale wax or slack wax, obtained from petroleum oil by distillation or solvent extraction, and may include microcrystalline wax and/or petrolatum such as obtained from petroleum residua. In general, paraffin wax having a melting point of from about 115° F. to about 150° F. is preferred, and such wax may comprise high molecular weight hydrocarbons, being generally straight-chain compounds having a crystalline structure in solid form. Microcrystalline wax may be employed as hereinbefore indicated, and is obtained from petroleum oil by distillation or fractional crystallization, employing selected solvents. This material may possess a melting point of about 150° F. to about 190° F. and contains a substantial portion of high molecular weight hydrocarbons having branched-chain and ring structures. Such material is more plastic in nature than paraffin wax, being amorphous in form and lacking a well-defined crystalline structure. In certain instances, petrolatum may also be present in conjunction with the paraffin wax to comprise the wax phase of the emulsion. Petrolatum is commercially obtained from petroleum and largely contains paraffin wax in substantial amount, namely, as high as 30 to 40 percent of the total wax content. Where petrolatum is employed in the wax phase, this material is generally present in an amount from about 5 to about 50, and preferably from about 25 to about 45 percent, by weight, based on the total weight of the wax phase.

In addition to the aforementioned components of the emulsion composition employed for controlling transpiration, there may also be incorporated in these compositions minor amounts of wetting agents, such as iso-octyl phenoxy polyethoxyethanol, esters of sodium sulfosuccinic acid, alcohol sulfates and the like. Insecticides may also be incorporated in these wax emulsion compositions in minor amounts, such as 1,1,1-trichloro-2,2-bis(p-chlorophenyl) ethane and benzene hexachloride. Fungicides may also be incorporated in these wax emulsion compositions in minor amounts, such as formaldehyde, and phenolic compounds, particularly the chlorinated phenolic compounds. Other biocidal agents may be used, depending on the specific application and need.

Furthermore, the emulsion composition may also contain minor amounts of materials which have an effect on stomatal closure. The leaf stomata, or pores, normally open and close, depending on light and other environmental factors. Chemical agents are known, which cause stomatal closure by a biochemical mechanism. Notably, phenyl mercuric acetate and the monoethyl and monoglyceryl esters of decenylsuccinic acid are reported to have this effect. Other materials may physically block the stomata would include clay-like materials. Presumably, a plate-like structure may cover or partially cover the stomata so that the passage of water therethrough is retarded. An added benefit of clay-like particles, including pigments such as titanium dioxide, lies in their ability to reflect strong rays of the sun, which might otherwise damage leaf tissue because of excessive heat in addition to causing excessive water loss. In addition, the emulsion may also have incorporated therein minor amounts of thickening agents such as cellulose derivatives, natural gums, or water dispersible synthetic polymers, for maintaining contact of the wax emulsion with the plant surface.

DESCRIPTION OF SPECIFIC EMBODIMENTS

The following exemplary data will serve to illustrate the improved results realized in employing the novel emulsion compositions of the present invention in effectively controlling transpiration in plants, without substantially interfering with the exchange of gases essential for photosynthesis to take place. For purposes of making such comparative evaluation, an anti-transpirant emulsion comprising wax, emulsifier and water (Emulsion A) was compared with the same emulsion in which a polymer was substituted in whole (Emulsion B) or in part (Emulsion C) for the wax component, and the respective rates of water, oxygen, nitrogen and carbon dioxide diffusion were measured.

Emulsion A comprised, by weight, paraffin was (125–127 AMP) 30%; a mixture of $C_{20}$–$C_{22}$ fatty organic acids 3.0% and diethanolamine 2.1% as an emulsifier; and 64.9% water.

Emulsion B comprised the same components as in Emulsion A, except that the wax component was wholly replaced by polyethylene having a molecular weight of 1500–8000, and a density of 0.925–0.964.

Emulsion C comprised the same components as in Emulsion A, except that 50% by weight of the wax component was replaced by the same polyethylene as employed in Emulsion B.

The aforementioned diffusion rates were measured in accordance with standard test method ASTM D-1434-63.

In the following Table is shown the comparative data obtainable with respect to the aforementioned measurements:

TABLE

Gas diffusion rates

[cc./100 in. 2/mil/24 hrs./atm.]

| Emulsion: | Water | Oxygen | Nitrogen | Carbon dioxide |
|---|---|---|---|---|
| A | 0.2–0.7 | 3–5 | 2–4 | 10–20 |
| B | 0.5–1.0 | 100–400 | 50–350 | 300–1,200 |
| C | 0.25–0.75 | 50–200 | 25–175 | 150–600 |

As will be seen from the comparative data of the foregoing Table, a highly increased diffusion rate in favor of the polymeric material for oxygen, nitrogen and carbon dioxide is realized, with little change in water vapor pressure. It will be apparent, of course, that if sufficient wax base anti-transpirant is applied, so as to form a continuous barrier film on a plant surface, transpiration is effectively stopped, but so is photosynthesis and the plant will become moribund. On the other hand, employing the novel polymer-containing emulsions of the present invention, a practical useful diffusion rate of photosynthesis gases is realized with no appreciable reduction in anti-transpiration properties.

From the foregoing, it will become apparent that the present invention provides an effective method for controlling transpiration in plants without interfering with the exchange of gases essential for photosynthesis. It will also be apparent that the emulsions applied to the plant's surfaces can, of course, be varied to adapt them to specific commercial requirements. Although the present invention has been described herein by means of certain specific embodiments and illustrative data, it is not intended that the scope thereof be limited in any way and is capable of various modifications and adaptations, as those skilled in the art will readily appreciate.

We claim:

1. A method for controlling transpiration in plants, which comprises: applying to the plant surface an emulsion composition comprising, by weight, from about 5 percent to about 50 percent polyethylene, from about 2 percent to about 10 percent of an emulsifier, a minor proportion of wax based on the total weight of polymer and wax present, from about 5 percent to about 50 percent petrolatum based on the total weight of the wax phase, and water in an amount sufficient to form the emulsion.

2. The method of claim 1 wherein said emulsion contains, by weight, from about 30 to about 45 percent polyethylene and from about 4 percent to about 8 percent emulsifier.

3. The method of claim 1 wherein said emulsion contains, by weight, petrolatum in an amount from about 25 percent to about 45 percent.

4. The method of claim 1 wherein the wax comprises a paraffin wax.

5. The method of claim 1 wherein the emulsifier is selected from the group consisting of non-ionic and anionic emulsifiers.

6. The method of claim 1 wherein the emulsifier comprises a mixture of sorbitan monooleate and polyoxyethylene sorbitan monooleate.

7. The method of claim 1 wherein the emulsifier comprises a triethanolamine soap.

8. The method of claim 1 wherein the emulsifier comprises an amine salt of an acid selected from the group consisting of organic acids having from about 1 to about 18 carbon atoms and inorganic mineral acids reacted with an amine having from about 10 to about 40 carbon atoms.

9. The method of claim 1 wherein said emulsion contains a minor proportion of iso-octyl phenoxy polyethoxyethanol as a wetting agent.

10. The method of claim 1 wherein said emulsion contains a minor proportion of 1,1,1-trichloro-2,2-bis(p-chlorophenyl) ethane as an insecticide.

References Cited

UNITED STATES PATENTS

| | | | |
|---|---|---|---|
| 2,057,413 | 10/1936 | Bridgeman et al. | 117—3 |
| 3,328,326 | 6/1967 | Sawyer et al. | 260—28.5 A |
| 3,619,249 | 11/1971 | Cannon | 117—168 X |
| 3,144,299 | 8/1964 | Frick et al. | 117—143 A |
| 2,402,896 | 6/1946 | Kerr | 424—353 |
| 2,232,595 | 2/1941 | Dittmar et al. | 117—3 UX |
| 3,323,925 | 6/1967 | Kesslin et al. | 106—10 |
| 3,000,753 | 9/1961 | Rockland | 117—18 |

FOREIGN PATENTS

| | | | |
|---|---|---|---|
| 623,410 | 7/1961 | Canada | 117—3 |

WILLIAM D. MARTIN, Primary Examiner

H. J. GWINNELL, Assistant Examiner

U.S. Cl. X.R.

117—168; 260—28.5 A